April 26, 1966   L. E. RUSSELL   3,248,576
ELECTRICAL WIRING AND CONDUIT ASSEMBLY
Filed Feb. 28, 1961   4 Sheets-Sheet 1

INVENTOR.
LON E. RUSSELL
BY
his ATTORNEYS.

April 26, 1966 L. E. RUSSELL 3,248,576
ELECTRICAL WIRING AND CONDUIT ASSEMBLY
Filed Feb. 28, 1961 4 Sheets-Sheet 2
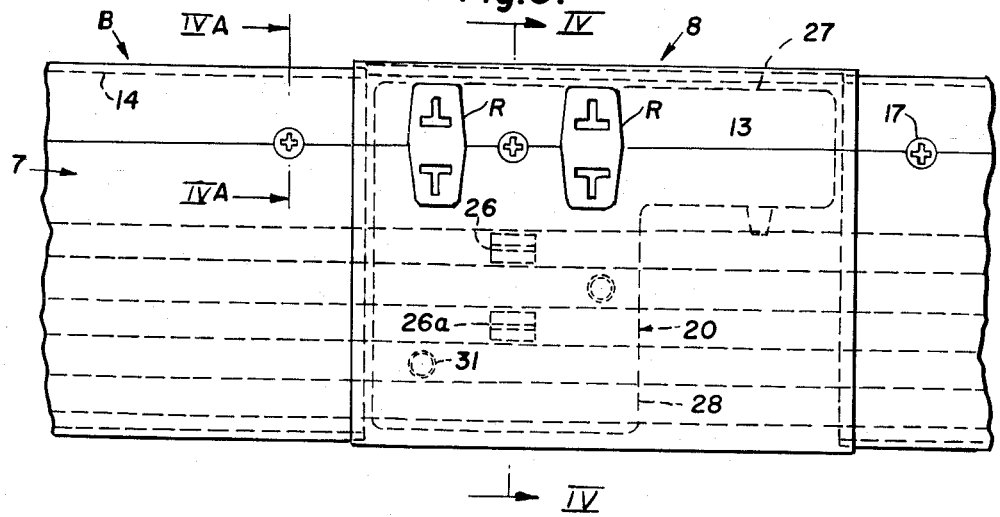
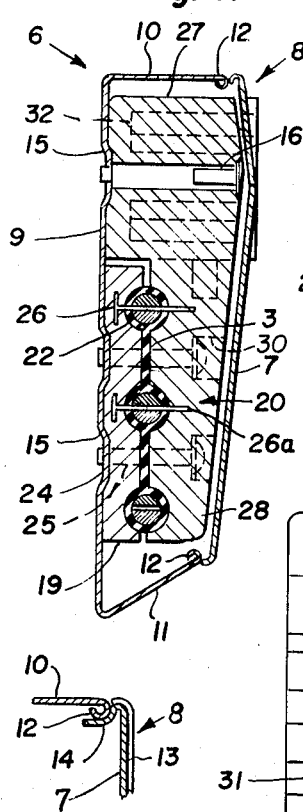
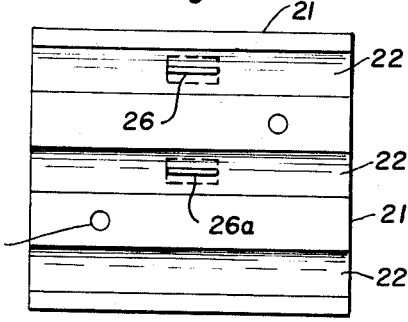
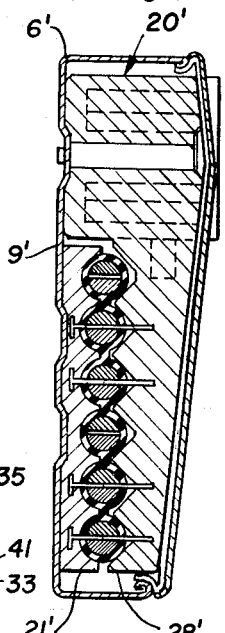
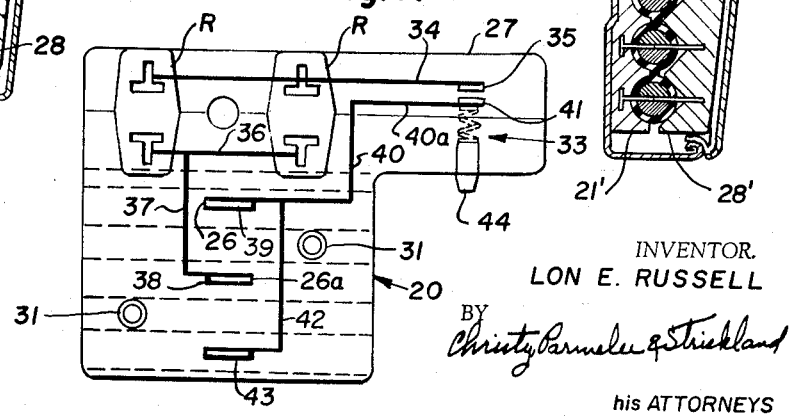
INVENTOR.
LON E. RUSSELL
BY Christy Parmelee & Strickland
his ATTORNEYS

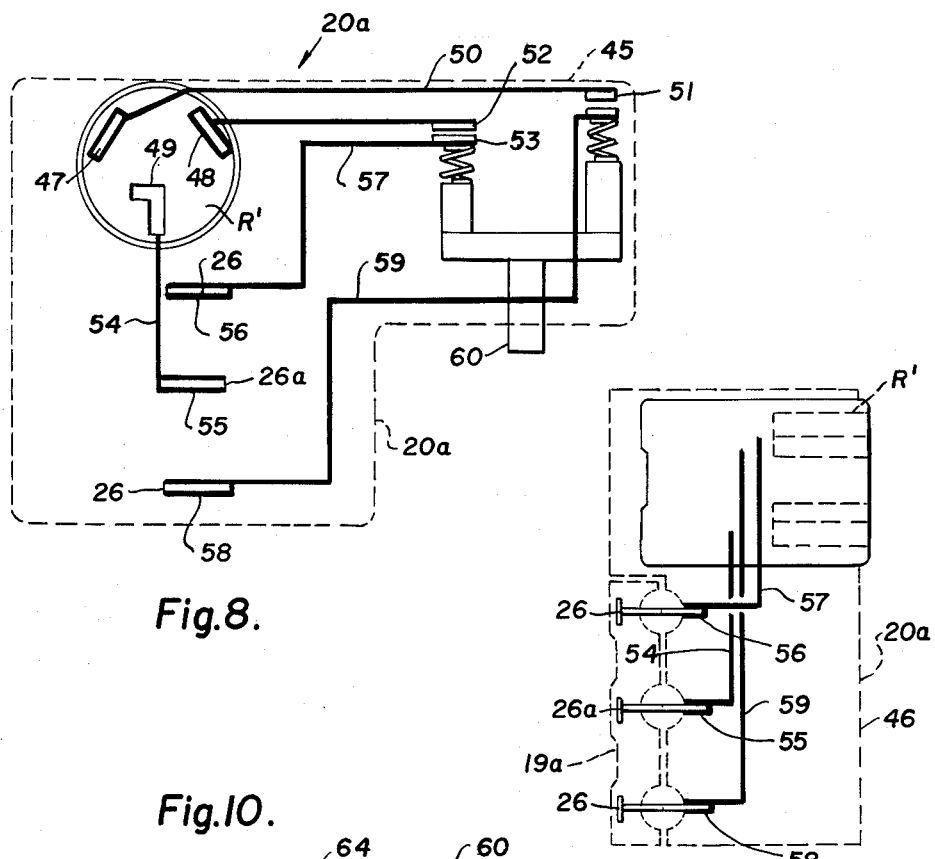

United States Patent Office 3,248,576
Patented Apr. 26, 1966

3,248,576
ELECTRICAL WIRING AND CONDUIT ASSEMBLY
Lon E. Russell, Mount Lebanon Township, Allegheny County, Pa., assignor to Electric Rings, Inc., Pittsburgh, Pa., a corporation of Pennsylvania
Filed Feb. 28, 1961, Ser. No. 92,327
14 Claims. (Cl. 307—147)

This application is a continuation-in-part of my co-pending application Serial No. 747,783, filed July 10, 1958 and now abandoned.

The present invention relates to a system of electrical wiring and apparatus for accomplishing same providing maximum economy, safety and convenience by providing a sectional baseboard member enclosing power lines providing 120 and 240 volts through receptacles within the sectional member and accesible from the face thereof.

The customary wiring for residences and the provision of outlets for power take-off customarily provides outlets for initially anticipated demands. Subsequently when additional outlets are required, these are usually connected with adjacent circuits. This frequently results in over-loading of individual circuits or additions of circuits resulting in unsightly additional wiring. Frequently both 120 and 240 volt outlets are required in the same room of the residence and this requires additions of a plurality of wires to accommodate these different power demands.

It is the purpose of the present invention to provide an unobtrusive exposed conduit for housing all wiring and outlets for each room of the residence, which conduit may be initially inter-connected to include all house wiring and the individual protection of each circuit at each outlet. Thus the same conduit may be initially installed, as a baseboard for example, to contain all wires, presently desired outlets and all additional outlets subsequently provided.

One object of the invention is to provide a perimeter system of residential wiring of any suitable ampere capacity from which outlets may be entered at any desired point with each outlet fused at its point of attachment.

Another object of the invention is to provide a perimeter wiring system of any desired ampere capacity from which outlets of 120 and 240 volts and suitable amperage may be either initially or subsequently taken, with each outlet providing a fused circuit between the perimeter system and the point of power use.

Another object of the invention is to provide a fully enclosed raceway or circuit for housing the perimeter wiring system which conduit may be customarily constructed for installation during erection or after the residence is erected and may be readily entered at any point therealong for installation at any future time of additional outlets to the system.

Another object of the invention is to provide a fused outlet receptacle which may be mounted in such a manner in said conduit at any suitable point so as to balance the loads on the perimeter wiring.

Another object of the invention is to provide a sectional conduit to accommodate the perimeter wiring system to any residential floor plan, door openings and partitions for installation after completion of the residence.

A further object of the invention is to provide such as perimeter wiring system and conduit whereby wall switch control for any outlet or ceiling lights may be provided.

These and further objects will be made apparent from the following specification and drawing forming a part thereof wherein:

FIG. 3 shows in elevation a preferred form of conduit housing the cable and mounted as the baseboard of a residence;

FIG. 4 shows a cross-section through the conduit, cable and outlet taken on lines IV—IV of FIG. 3;

FIG. 4A shows a fragmentary transverse sectional view through a portion of the baseboard conduit;

FIG. 5 shows a plan view of the insulator back block of and outlet device and having stabs mounted therein;

FIG. 6 shows a plan view of the outlet front block including circuit breaker protective device for 120 volt service;

FIG. 7 shows a cross-section through the baseboard or conduit housing two three-wire cables;

FIG. 8 shows a plan view of a front insulator block of an outlet device for 240 volt service, with fusing means;

FIG. 9 shows a side elevation of FIG. 8;

FIG. 10 shows an un-fused type of connection device between the conduits at opposite sides of a doorway and other openings;

Figure 1:
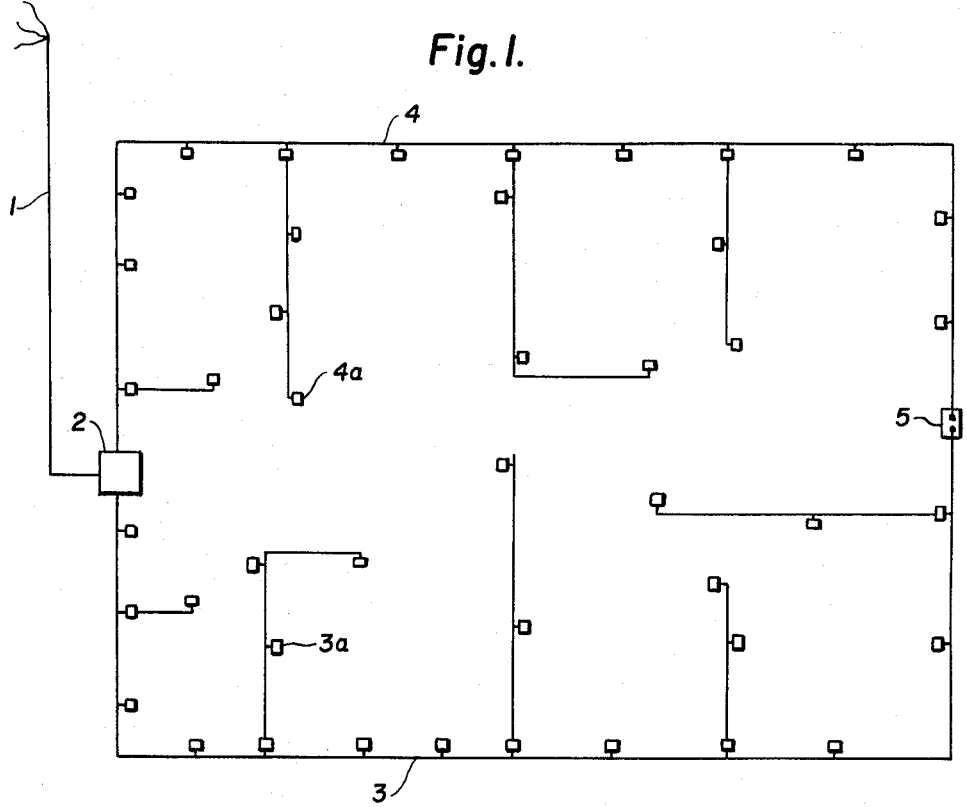
FIG. 1 is an exemplary wiring diagram illustrating the perimeter wiring system.

The perimeter system of wiring as disclosed in FIG. 1 comprises a power inlet line 1 entered into a junction box 2 protected by suitable circuit breakers and from there extended around the perimeter of each floor of the residence as cables 3 and 4. It will be noted that cables 3 and 4 enter the terminal box 5, but there is no connection between lines 3 and 4 at the said terminal box. In effect, lines 3 and 4 are independent of each other. They are terminated in a single box for convenience, but could equally well be terminated in separated boxes, for each cable.

Preferably each cable 3 and 4 is comprised of three wires suitably insulated and capable of delivering either 120 volt or 240 volt service at each outlet connected therewith. Each cable 3 and 4 is suitably constructed to transmit amperage sufficient for immediate and certain anticipated needs. If necessary at the time of installation, each cable 3 and 4 may be duplicated by cables 3a and 4a. Under the invention, each cable 3 and 4, or pairs of cables 3, 3a and 4, 4a will be enclosed within separate metal raceways or conduits. Such a conduit is preferably of a form suitable for service as the baseboard of each room and may be of sufficient size to receive only cables 3 or 4, or both 3 and 3a depending upon the anticipated power to be drawn therefrom. Although each cable 3 and 4 may be constructed to deliver 240 volts at 100 or more amperes, each outlet therefrom controls both the voltage and amperes of power delivered therefrom. Outlets 3a and 4a are indicated generally along the cables 3 and 4. The details of construction of both the conduit housing the cables and the outlets therefrom will hereinafter be described in detail.

A conduit suitable for use as a baseboard carrying a single three wire cable 3 or 4 is shown in FIGS. 3, 4 and 4a of the drawings. A larger similarly constructed baseboard capable of carrying two three wire cables 3 and 3a or 4 and 4a is shown in cross-section at FIG. 7. Each conduit or baseboard B is comprised of a back member 6, front cover plate 7 and an outlet cover plate 8. Back member 6 is comprised of an upright portion 9, a forwardly extending top portion 10 and a forwardly extending inclined bottom portion 11. The outer ends of portions 10 and 11 are preferably rounded at 12 and engaged by a front cover plate 7 having a face portion 13 whose top and bottom portions terminate in inwardly offset portions 14 received between the back member portions 12, as clearly shown in FIG. 4a.

As shown in FIG. 4, the baseboard back member portion 9 is provided with inwardly offset portions 15 for reception of threaded fastening members hereinafter discussed. Any suitable means may be used to secure the baseboard 6 in place, either as recessed into the room wall or abutted against such wall. One such means could be threaded fasteners passing through suitable openings (not shown) in the upright portion 9 into the adjacent wall. The front cover plate 7 may be additionally secured to the back member 6 in any suitable manner, as by providing recessed openings 16 in the cover plate portion 7 and providing suitably aligned openings (not shown) in recessed portions 15 of the back member 6 to receive screw-threaded fasteners 17 (FIGURE 3) connecting the two together.

At each outlet along the baseboard the cover plate 7 is interrupted and a suitable outlet face plate 13 is applied to the baseboard back member 6 to cover both the outlet and the adjacent ends of the interrupted cover plate 7. Each outlet is comprised of an insulating back block 19 and an insulating front block 20. The cable 3 extending longitudinally of the baseboard and to which each outlet it attached may consist of two or three wires. Where the potential demand is for 120 volts only, a two wire cable may suffice. Preferably a three wire cable will be used even though only 120 volt service is to be initially supplied. This permits flexibility in satisfactory future demands and even initial demands, as where electrical resistance heaters are employed as in kitchen ranges, laundry driers, etc. This is also advisable where high demand appliances such as air conditioners, certain types of lighting, etc. are to be used. In these cases, the cable wires can be suitably selected to service future anticipated needs and the circuits balanced between the two hot and intervening neutral wires.

Figure 2:
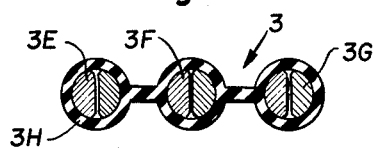
FIG. 2 shows an enlarged cross-sectional view of a preferred form of three-wire cable assembly for use in the perimeter wiring system.

The three wire cable 3 of the invention has each wire comprised of two halves which are substantially semi-circular in shape and enclosed in an insulating cover 3H. Each two-piece wire is preferably connected with the next adjacent two-piece wire by a web of the same insulating material. Such two-piece wires are indicated in FIG. 2 as 3E, 3F and 3G. Each half wire has its flat portion joined with the semi-circular portion by arcuate surfaces giving the general appearance of a modified capital letter D. These adjacent half wire arcuate surfaces serve a useful purpose in facilitating the entrance between the half wires of the shank of the stabs, to be hereinafter discussed. It will be understood that the entering stabs tend to separate the half wires and the surrounding insulation by resisting separation insuring good electrical contact.

Referring now to FIGS. 3, 4 and 5 of the drawing illustrating the general construction of the outlets, the rear insulation blocks 19 (FIG. 5) have spaced substantially semi-circular indentations 22 upon the face thereof in which the three wire cable 3 is seated. The face of the block 19 between the indentations being flat providing a bearing surface for the web portions of the cable 3. The block 19 has spaced openings 23 extending therethrough and aligned with the openings 24 in recessed portions 15 of the back member 6 to receive suitable screw fasteners such as 25. Block 19, at the two upper indentations 22 has mounted therein a generally T-shaped stab or contact member 26 whose elongated shank extends outwardly through the center of each indentation 22 a distance greater than the diameter of the two-piece wire and insulating covering thereon. Preferably the cable 3 will be comprised of three wires, even though only 120 volts will be drawn therefrom. Therefore, it is desirable in all cases to provide standard blocks having three indentations. When 120 volt outlets are provided, only the upper two of indentations 22 are provided with stabs 26. The block 19 can then be rotated 180° in order to balance the total load between the two outer hot wires of the cable 3. It being understood that the wire 3F (FIG. 2) will be the neutral wire and wires 3E and 3G will always be hot wires.

Referring now to FIGS. 4 and 6 of the drawing illustrating a cross-section and plan view of the front insulation block 20, it will be noted that the block 20 is of modified inverted L-shape. The horizontal leg 27 being of greater thickness than the vertical leg 28. This results from the leg 28 being recessed to overlie the back insulation block 19. The leg 28 has on its under face indentations 22 which overlie the cable 3 so as to cooperate with similar indentations in block 19 to clamp cable 3 in position within the baseboard. Above the center of each indentation 22 in leg 28, the block is suitably recessed to receive the upper ends of the stabs and a suitable contact from the receptacle R as to be discussed. The upper face of leg 28 has recessed openings 30 from the base of which extend openings 31 aligned with openings in the back insulation block 19 to receive the screws 25 clamping the two blocks together and to the wall 9 of the member 6. The horizontal leg 27 has suitably spaced openings 32 therein to receive the spring clips of each receptacle R for reception of the two prongs of the connection plug to be received therein. To one side of the receptacle R and within leg 27 is mounted a suitable fusing device, which is preferably a single pole circuit breaker 33.

The electrical circuit between the receptacles R, circuit breaker and stabs is illustrated in FIG. 6 wherein one side of each receptacle R has its spring contacts connected by conductor 34 with the fixed pole 35 of the circuit breaker 33. The remaining spring contacts of each receptacle R are connected by conductor 36 and conductor 37 to a spring clip 38 which engages the stab 26a extending through the neutral wire 3F of cable 3. The hot wire 3E of cable 3 and stab 26 are connected by spring clip 39 and conductor 40 to movable pole 41 of the circuit breaker 33. Conductor 42 connects conductor 40 with spring clip 43 positioned to contact stab 26 which may extend through hot wire 3G. This stab 26 is not presently shown in FIG. 4 but would be utilized when rear insulator block 19 is rotated 180° as previously discussed. The portion 40a of conductor 40 is a conventional bimetallic member, which when the circuit is overloaded moves free of contact 35. The portion 40a is returned to engagement with contact 35 by the spring loaded reset button 44.

Referring now to FIGS. 8 and 9 of the drawing illustrating an outlet for 240 volt service, it will be noted that this outlet is substantially the same as for 120 volt service, except for the change in form of outlet R' and the electrical connections between the outlet, circuit breaker and cable stabs.

In FIG. 9 the conduit or baseboard member 6 is identical with that shown in FIG. 4 and the outlet cover plate 8a is similar to the plate 8 of FIG. 3 except for the change in the form of opening to permit access to the single receptacle R'.

The back insulation block 19a, of FIG. 9, is similar to the block 19 of FIG. 4, except that it is provided with stabs which extend through all three wires of cable 3. The front insulator block 20a of FIG. 9 is similar in general shape to that of block 20 of FIG. 4, but the electrical connections between the cable stabs, the outlet R' and two-pole circuit breaker are different as well as are the outlet R' and the circuit breaker.

Referring now in detail to FIGS. 8 and 9, the front insulator block 20a of general inverted L-shape with the top horizontal leg 45 of substantially uniform thickness and the depending vertical leg 46 recessed to overlie the back insulator block and in spaced relation thereto. Within the horizontal leg 45 is a central aperture receiving the receptacle R' provided with the usual three openings having therein the usual spring clips 47, 48 and 49 contacting the prongs of the usual connection plug inserted therein. Spring clip 47 is connected by conductor 50 with pole 51 of the circuit breaker. Spring clip 48 is connected by conductor 52 with pole 53 of the circuit breaker. Spring clip 49 is connected by conductor 54 with the neutral cable wire 3F stab 26a by a suitable spring clip 55. The upper cable wire 3E stab 26 is connected through a suitable spring clip 56 and conductor 57 with pole 53 of the circuit breaker. The lower cable wire 3G stab 26 is connected through a suitable spring clip 58 and conductor 59 to the pole 51 of the circuit breaker. The circuit breaker referred to herein is a conventional form of thermal type circuit breaker modified for mounting within the front insulator block. As such it has a conventional reset button provided with coil springs connected to the conductors 57 and 59.

The perimeter wiring system referred to herein will at times have the baseboard interrupted by doorway openings. In such cases a suitable connection device is provided to connect the baseboard cables at opposite sides of the doorway. Such a connection device may also be used to connect baseboards on opposite sides of a partition or serve as an unfused take-off for any desired purpose.

FIG. 10 shows such a connection device wherein the rectangle 60 conventionally indicates a housing member which may readily be a section of the two-piece baseboard as found between outlet openings. Within the housing 60 is a suitably mounted rear insulator block similar to that previously shown and a front insulator block of the general type herein shown. These two insulated blocks clamp a section of the three-wire cable 3. Within the front insulator block extend transverse opening receiving hollow metal sleeves 61, 62 and 63, so as to be accessible from either side of the front block. Each sleeve adjacent each end thereof is provided with suitable clamping screws 64 to retain one end of a bare wire inserted therein. Sleeve 62 has suitably attached thereto, within the front block, a conductor 65 terminating in a spring clip 66 for receiving the stab of the neutral wire of the cable 3. Similarly sleeve 61 is connected by conductor 67 and spring clip 68 to one hot wire stab of cable 3 and sleeve 63 is similarly connected by conductor 69 and spring clip 70 to the other hot wire stab of cable 3.

Such device where used at a doorway opening could be mounted in adjacent ends of the baseboard at opposite sides of the opening. Any suitable insulated three-wire cable could then be disposed below floor level and extend upwardly at each side of the door opening for bare wire connection to the respective sleeves 61, 62 and 63. At the base of the device the aforesaid cable 3 would terminate between the front and rear insulator blocks with the rear insulator block stabs extending through the cable 3 wires and into engagement with the respective spring clip of the front insulator block. In this manner an electrical connection is provided between the baseboard cables 3 at opposite sides of the door opening and provides the continuity of the perimeter wiring system.

Figure 11:
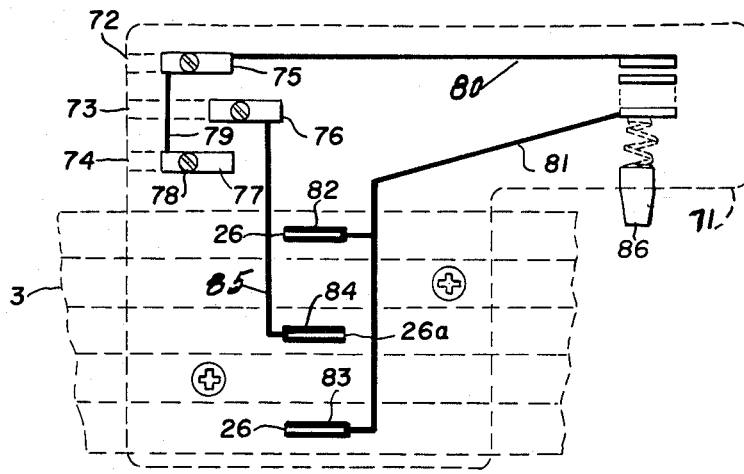
FIG. 11 shows a plan view of a fused 120 volt take-off device.

FIG. 11 shows a form of fused 120 volt take off device which may be used within the baseboard between the usual outlets, herein described, for servicing ceiling or wall lights. Here the baseboard back member 6 has mounted therein the aforesaid rear insulator block 19 provided with stabs 26 and 26a as shown in FIG. 4. Overlying the block 21 is a front insulator block 71 having the same general shape as the front insulator block 20 of FIG. 4.

The front insulator block 71 and rear insulator block 19 are secured within the baseboard in the same manner as in FIG. 4 so as to clamp between them the cable 3 extending longitudinally of the baseboard. In place of the usual receptacle R mounted in the front insulator block, the block 71 has spaced transverse openings 72, 73, 74 extending inwardly from the left side thereof. Within these openings are mounted suitable hollow metal sleeves 75, 76 and 77 as indicated in FIG. 11. Each such sleeve has a suitable wire clamping screw 78 mounted therein.

A suitable conductor 79 connects sleeves 75 and 77. A conductor 80 connects sleeve 75 to one contact 80 of a suitable single pole thermal type circuit breaker. The other pole of such circuit breaker is connected through a suitable conductor 81 to the stabs 26 of the back insulator block through suitable spring clips 82 and 83. The stab 26a is connected through spring clip 84 and conductor 85 with sleeve 76. The circuit breaker is provided with a suitable spring loaded reset button 86.

The take-off device so far described provides suitable protection for any lights or appliance powered from the sleeves 75, 76, 77. Power from such sleeves is obtained by suitable insulated wires having a bare wire connection to the sleeves through the clamping sleeves therein. The insulated portions of the wires extend from the back of the baseboard through suitable openings (not shown) and upwardly or downwardly within the adjacent wall to any desired location. Obviously the flow of current from the said sleeves can be controlled by any suitable commercially available switch.

Figure 12:
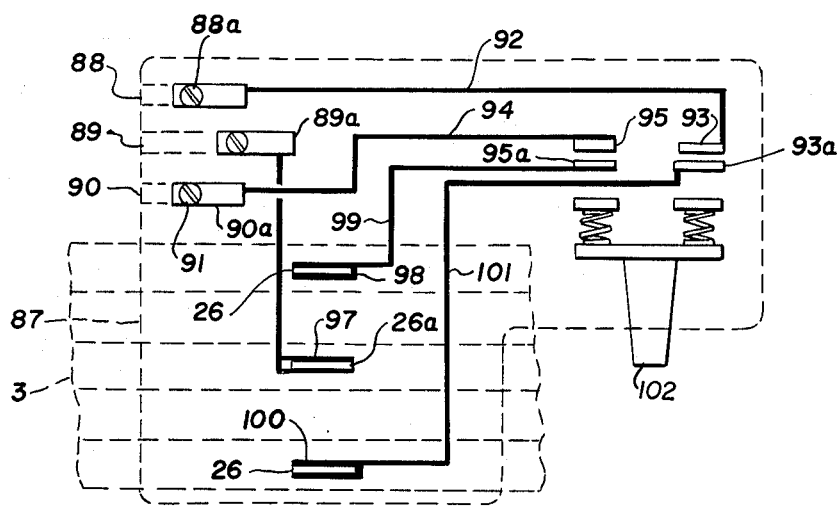
FIG. 12 shows a plan view of a fused 240 volt take-off device.

FIG. 12 is a plan view of a take-off device similar to that of FIG. 11, but adapted for 240 volt service. For this purpose the rear insulator block similar to block 20 will be provided with three stabs 26, 26a and 26. The front insulator block 87 may be the same size as block 20, modified in the following manner. Extending inwardly from the upper left edge are three openings 88, 89 and 90. Within such openings are the hollow metal sleeves 88a, 89a and 90a, each having a suitable wire clamping screw 91 therein. Sleeve 88a has connected therewith a suitable conductor 92 extending to one pole 93 of the two pole suitable thermal type circuit breaker. Sleeve 90a has connected therewith a suitable conductor 94 extending to the second pole 95 of the said circuit breaker. Sleeve 89a is connected by conductor 96 to a suitable spring clip 97 engaging stab 26a of the three-wire cable 3. One stab 26 of the cable 3 is engaged by suitable spring clip 98 which is connected by the conductor 99 with breaker pole 95a, the remaining stab 26 is similarly connected by spring clip 100 and conductor 101 with breaker pole 93a. The circuit breaker is provided with a suitable reset button 102. Each of the sleeves provides for bare wire connection to suitable insulated wires (not shown) extending therethrough through a suitable opening (not shown) in the back of the baseboard (not shown) for extension upwardly for servicing ceiling and wall lights or appliances. Such wires (not shown) may also pass through a suitable switch for control of current flow.

The hereinbefore described baseboard conduit, outlets and take-off devices provide an economical, safe, flexible means for installing the perimeter wiring system illustrated in FIG. 1. Each outlet is fused at its point of attachment to the system. Any suitable approved conventional fusing means maybe employed, either the preferred circuit breakers illustrated or plug fuses or cartrige fuses having the approved ampere rating suitable for the lamp or appliance to be serviced. Likewise any approved clamping device may be substituted for the stabs illustrated to make contact with wires of the said cable.

The flexibility of use for the proposed assembly of baseboard, outlets and take-offs is readily apparent, particularly in the residential field. When the popular prefabricated basic home is designed, the baseboard with a pre-selected number of outlets can be factory pre-cut and pre-assembled for each room to provide balanced loads on all cables 3 mounted in the baseboard. The required number and sizes of connection devices, FIG. 10, may be supplied and installed by skilled labor, when installing the baseboards. The baseboard cover plates are readily accessible for removal for installation of additional fused outlets. The cover plate can then be readily cut to accommodate the additional outlets and the outlet face plates added to effect a neat and safe assembly. In the case of custom built homes the baseboard can be cut to size and special cable 3 along with suitable outlets assembled to suit any desired floor plan.

The perimeter wiring system provides many advantages over conventional house wiring. Full power to each outlet at its rated capacity is provided and any overload upon any outlet does not affect the remaining outlets or appliances serviced therefrom. The cables 3 and 4 (FIG. 1) being independent of each other, may be constructed of suitably sized wires to carry any reasonably anticipated needs or two such cables may be enclosed in a single baseboard as illustrated in FIG. 7. The total load on any cable or cables can be protected at the junction box or boxes 2 (FIG. 1) with suitable breakers of the required rated amperes.

It will be obvious to those skilled in the art that this invention is equally adaptable to commercial as well as residential buildings, where the conduit or baseboard can be utilized in the commercial buildings. Thus, office buildings, hospitals, hotels, schools, apartments, etc. can utilize the invention.

Additionally the invention is subject to many modifications for adapting it to specific uses. One such modification can be the use of a three phase, 4-wire cable where such type of service may be required. With this modified form of the invention, the back and front insulator blocks would be suitably modified to accommodate the 4-wire cable and the stabs therefor. The back insulator block would ordinarily have stabs for all four wires. The front block would then be modified to provide suitable circuitry for servicing either three-phase or single-phase electrical devices.

In certain situations, particularly residential, the greater load may be drawn from the cable adjacent to the service entrance. In such situations the cable, adjacent the service entrance, could be of a suitable size to carry the heavier fused loads and thereafter, a fused connector could be embodied in the conduit with one side of the connector receiving the larger wires and the opposite side of the connector receiving smaller sized wires extending throughout the remaining length of the cable where lighter loads are encountered.

Having shown and described by invention in its presently preferred form and using where possible conventional insulating materials and modified forms of conventional fusing devices, it will be understood that I do not intend to limit myself to the exact details of construction disclosed and described, except where made necessary by the scope of the appended claims.

I claim:

1. In a residential electrical wiring system in combination, a conduit comprising a back member for securing the conduit to a building wall and forwardly extending portions along top and bottom edges of the length of said back member, a cover plate extending the length of said back member and detachably engaging said forwardly extending portions of said back member, a cable extending longitudinally of said conduit and comprised of three transversely spaced two section wires enclosed in insulation, outlet assemblies spaced longitudinally of said cable and extending through said cover plate, each said outlet assembly comprising a rear insulator block and a front insulator block clamping said cable between and secured in fixed relation to said conduit back member, stabs fixed in said rear insulator block in alignment with said cable wires and extending through the adjacent wire betwen said wire sections thereof in contact therewith providing a hot wire contact and a neutral wire contact for two of said stabs, aligned recessed openings in the adjacent face of the front block receiving the ends of the stabs extending through said wires, a receptacle mounted in the exposed face of said front insulator block with means therein for receiving and embracing the two prongs of a connection plug to be inserted therein, means within said front insulator block providing an electrical circuit between said neutral wire stab received therein and the means engaging one prong of a connecting plug within said receptacle and a second electrical circuit between a hot wire stab and the means engaging the second prong of said connection plug received in said receptacle, and fusing means in said second-named front block electrical circuit.

2. The electrical wiring system as defined in claim 1, wherein the said outlet rear insulator block has stabs extending through both hot wires and the neutral wire of said cable, the receptacle mounted in said insulator front block has openings therein receiving three prongs of a connection plug to be mounted therein, the said means within said receptacle embracing all three connection plug prongs mounted therein, and the said second-named electrical circuit connects both hot wire stabs with the receptacle means engaging the hot wire prongs of said connection plug received in said receptacle.

3. The electrical wiring system as defined in claim 1, wherein the exposed face of the front insulator block of the outlet assembly is enclosed by a detachable front cover secured to the conduit and provided with an aperture exposing only the face of the said receptacle.

4. The electrical wiring system as defined in claim 1, wherein said rear insulator block is provided with only two stabs extending respectively through one outer wire and the intermediate wire of the cable, enabling the rear insulator block by 180° rotation about the cable intermediate wire selectively engages a cable neutral wire and one hot wire to balance the total cable load between said hot wires.

5. The electrical wiring system as defined in claim 1, wherein the said three wire cable forms part of an electrical power line extending continuously from the service inlet about a portion of the perimeter of the residence to a terminal box, and a second such electrical wiring system extends continuously from said inlet about the remaining portion of the perimeter of the residence to a terminal box without inter-connection between said system power lines at said terminal box.

6. Apparatus serving as a room baseboard source of fused convenience outlets for a residence in combination, a conduit having a back member for attachment along the base of a room wall and forwardly extending portions along the top and bottom edges of the length of said back member, a cable disposed within said conduit and extending continuously throughout the length thereof between said forwardly extending back member portions, at least one outlet device disposed in said conduit intermediate the ends thereof, a front cover plate extending from each each of the back member to adjacent the outlet device and between said back member top and bottom portions, means connecting said cover plate portions with said back member, said cable comprising transversely spaced wires enclosed in insulation and connected by webs of said insulation, the outer wires of said cable being hot wires and the intermediate wire the neutral wire, said outlet device comprising a rear insulator block disposed against said conduit back member and underlying said cable with indentations on the upper face of the block receiving each of said wires, a front insulator block overlying said wires and rear insulator block and extending beyond one edge of the said rear block into engagement with said conduit back member, stabs in said rear insulator block at said indentations therein and extending through at least one hot wire and neutral wire into suitable openings in the adjacent face of said front insulator block, a suitable receptacle in said front insulator block at the said extending portion thereof for receiving the prongs of a suitable connection plug, an electrical connection between one receptacle connection plug prong receiving portion, a fusing device within said front insulator block and said neutral wire stab, and a second electrical connection between at least one hot wire stab, the fusing device and a remaining prong of the connection plug within said receptacle, a face plate overlying said outlet device and means connecting the face plate and insulator blocks to said conduit back member, and an aperture in said face plate exposing the outer face of said receptacle.

7. Apparatus as defined in claim 6, wherein said conduit has mounted in one end thereof a take-off device comprised of a rear insulator block extending transversely of said cable, a front insulator block overlying said rear insulator block and cable, means clamping said blocks to said cable and to the conduit back member, stabs in said rear insulator block extending through each wire of the cable and into suitable openings in the adjacent face of said front insulator block, a plurality of apertures through said front insulator block to one side of said cable, a hollow metal sleeve in each said apertures, an electrical connection within said block between one of said sleeves and the stub of said cable neutral wire, an electrical connection between another of said sleeves, a stab extending through one of said cable hot wires and a fusing device, a second electrical connection between the remaining stab of a hot wire, another said sleeves and said fusing device, and means on each said sleeves for effecting an electrical connection between each said sleeve means and a wire inserted into said sleeve.

8. In an electrical wiring system, the combination of a conduit adapted to be secured to a building wall, a cable extending within said conduit and comprising at least two transversely spaced two section wires enclosed in insulation, outlet assemblies spaced longitudinally of said cable, each outlet assembly comprising a front insulator block positioned in close proximity to said cable and secured in fixed relation to said conduit, at least one stab extending through, and between the two sections of, each cable wire in contact therewith providing a hot wire contact and a neutral wire contact for two of said stabs, aligned openings in the adjacent face of said front block receiving the ends of the corresponding stabs extending through said wires, a receptacle carried by said block with means therein for receiving and embracing at least two prongs of a connection plug to be inserted therein, means within said front insulator block providing an electrical circuit between said neutral wire stab received therein and the means embracing one prong of a connection plug within said receptacle and a second electrical circuit between the hot wire stab and the means embracing the other prong of said connection plug received in said receptacle, and fusing means in said second electrical circuit.

9. The electrical wiring system as defined in claim 8, wherein the exposed face of the front insulator block of the outlet assembly is enclosed by a detachable front cover secured to the conduit and provided with an aperture exposing only the face of the said receptacle.

10. In an electrical wiring system, the combination of a conduit adapted to be secured to a building wall, a cable extending within said conduit and comprising at least three transversely spaced two section wires enclosed in insulation, outlet assemblies spaced longitudinally of said cable, each outlet assembly comprising a front insulator block positioned in close proximity to said cable and secured in fixed relation to said conduit, at least one stab extending through and between the two sections of each cable wire in contact therewith providing two hot wire contacts and a neutral wire contact for three of said stabs, aligned openings in the adjacent face of said front block receiving the ends of the corresponding stabs extending through said wires, a receptacle carried by said block with means therein for receiving and embracing the neutral prong and two hot prongs of a connection plug to be inserted therein, means within said front insulator block providing an electrical circuit between said neutral wire stab received therein and the means embracing the neutral prong of a connection plug within said receptacle and second and third parallel electrical circuits between the stabs of the two hot wire contacts and the means embracing the respective hot prongs of said connection plug received in said receptacle, and fusing means in at least one of said electrical circuits.

11. The electrical system as defined in claim 10, wherein said cable forms part of an electrical power line extending continuously from a service inlet about a portion of the perimeter of a building to a terminal box, and a second such electrical wiring system extends continuously from said inlet about another portion of the perimeter of said building to a terminal box without interconnection between said cables.

12. In a multiple outlet electrical system including a conduit adapted to be located about the perimeter of a room, the combination of a plurality of substantially parallel wires, including at least one hot wire and at least one neutral wire, insulated from each other and extending within said duct, each wire including at least two substantially parallel sections, a plurality of outlet assemblies, each outlet assembly comprising a block, means securing said block in close proximity to said wires, at least one electrical receptacle in said block adapted to receive therein at least two prongs of a connection plug, at least two spaced contactors insulated from each other carried by said block and adapted to correspond to said hot wire and said neutral wire respectively, at least one stab extending through and between said two sections of each wire in contact therewith, said stabs being engageable by the respective contactors, a first conductor means carried by said block and connecting one of said contactors to one side of said receptacle, a second conductor means carried by said block and connecting the other of said contactors to the other side of said receptacle, and fuse means carried by said block and interposed in one of said conduit means whereby an electrical overload of the fuse means at any one of the receptacles may interrupt the flow of current therethrough without necessarily interrupting the flow of current through the receptacle of any other outlet assembly in use in the system.

13. In an electrical wiring system, the combination of a conduit adapted to be secured to a building wall, a cable extending within said conduit and comprising at least two transversely spaced wires enclosed in insulation, outlet assemblies spaced longitudinally of said cable, each outlet assembly comprising a front insulator block positioned in close proximity to said cable and secured in fixed relation to said conduit, contact members extending through the insulation and contacting each cable wire providing a hot wire contact and a neutral wire contact for two of said contact members, aligned openings in the adjacent face of said front block receiving the ends of the corresponding contact members contacting said wires, a receptacle carried by said block with means therein for receiving and embracing at least two prongs of a connection plug to be inserted therein, means within said front insulator block providing an electrical circuit between said neutral wire contact member received therein and the means engaging one prong of a connection plug within said receptacle and a second electrical circuit between said hot wire contact member and the means engaging the second prong of said connection plug received in said receptacle, and fusing means at least in one of said electrical circuits.

14. For use in an electrical wiring system, an elongate cable comprising at least one wire, an insulation material enclosing said wire, said wire including two substantially parallel uninterrupted sections substantially semi-circular in cross-section with substantially flat portions joining substantially semi-circular portions thereof, said flat portions of the two sections being held in contacting engagement by the insulation material, and the two sections being arranged to receive metallic stabs therebetween in contact therewith and extending through the insulation material adjacent at least one side of the wire.

(References on following page)

References Cited by the Examiner

UNITED STATES PATENTS

| | | | |
|---|---|---|---|
| 1,207,862 | 12/1916 | Chapman | 317—2 |
| 2,299,989 | 10/1942 | Johnson | 339—97 |
| 2,395,373 | 2/1946 | Johnson | 339—97 |
| 2,396,119 | 3/1946 | O'Neil | 339—97 |
| 2,470,788 | 5/1949 | O'Brien | 339—22 |
| 2,613,309 | 10/1952 | Frere | 339—22 |
| 2,667,547 | 1/1954 | Lindman | 200—115.5 |
| 2,720,632 | 10/1955 | Stieglitz | 200—115.5 |
| 2,939,101 | 5/1960 | Johnson | 339—23 |
| 2,963,676 | 12/1960 | Sneesby | 339—23 |

LLOYD McCOLLUM, *Primary Examiner.*

JOHN F. COUCH, *Examiner.*